March 21, 1939.  W. VON BLEICHERT  2,151,287
STEERING DEVICE FOR ENDLESS TRACK DRIVEN VEHICLES
Filed Jan. 9, 1936  3 Sheets-Sheet 1

Inventor:
Wolfram von Bleichert
By Emil Bonnelycke
Attorney

March 21, 1939. W. VON BLEICHERT 2,151,287
STEERING DEVICE FOR ENDLESS TRACK DRIVEN VEHICLES
Filed Jan. 9, 1936 3 Sheets-Sheet 2
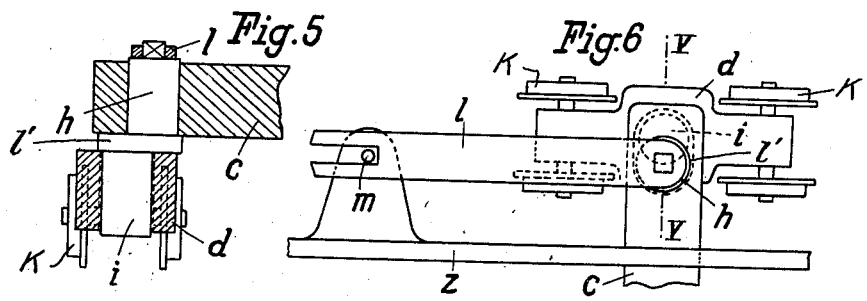
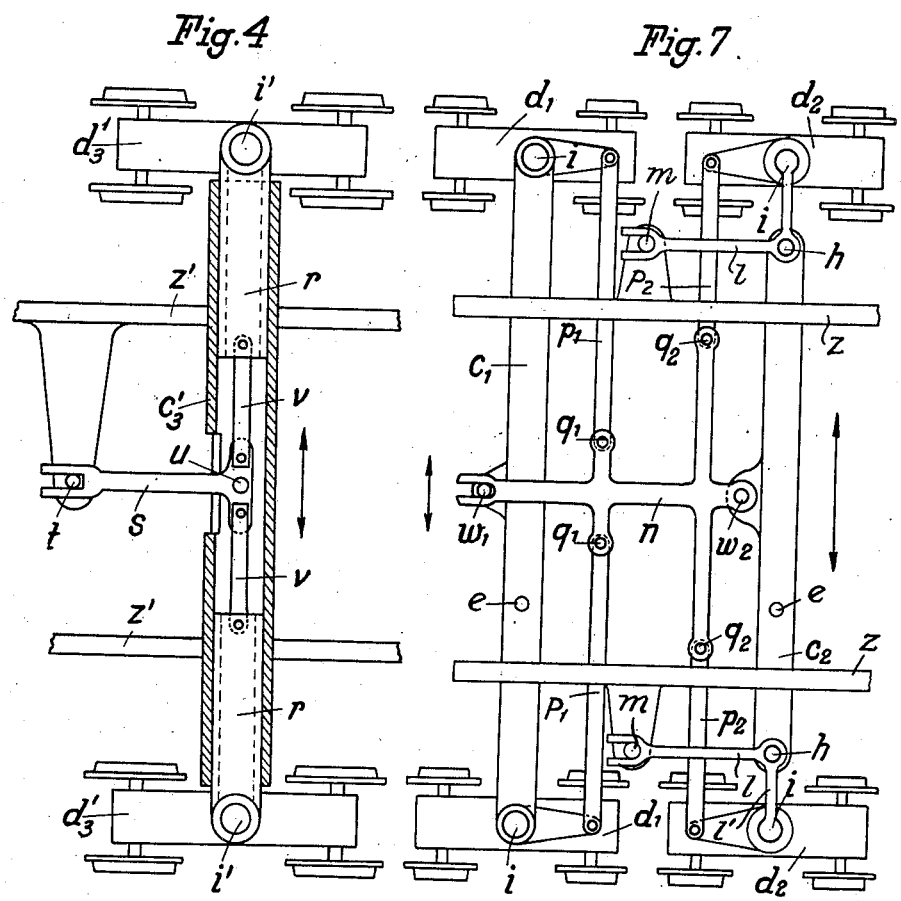
Inventor:
Wolfram von Bleichert
By Emil Bönnelycke
Attorney

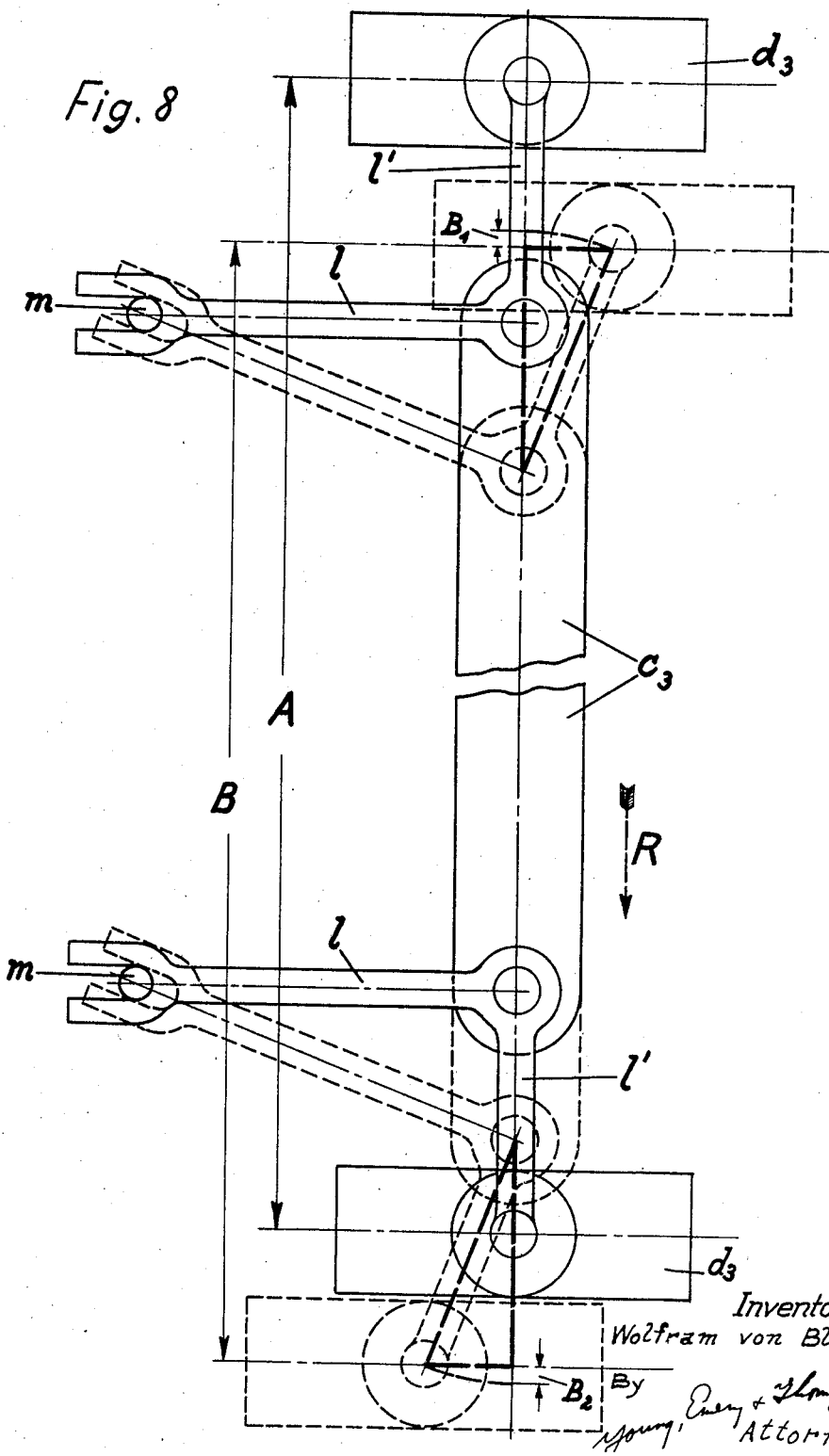

Patented Mar. 21, 1939

2,151,287

UNITED STATES PATENT OFFICE 2,151,287

STEERING DEVICE FOR ENDLESS TRACK DRIVEN VEHICLES

Wolfram von Bleichert, Leipzig, Germany, assignor to Walter Agahd, Berlin, Germany Application January 9, 1936, Serial No. 58,389
In Germany January 15, 1935

9 Claims. (Cl. 180—9.1)

The invention relates to steering devices for endless track driven vehicles, in which during steering the supporting rollers are displaced laterally in relation to the chassis and at the same time are also rocked.

The invention is based on the recognition that when taking a curve the inner endless track chain requires to be curved to a greater extent than the outer one.

According to the invention this object is accomplished by the fact that the transverse spacing of the pairs of supporting rollers is adjustable in such fashion corresponding to the setting of the steering device that the supporting rollers which are located on the inside when taking a curve are adjusted to a smaller radius than the outer ones.

When using slotted slides of the known kind for displacing the axles of the supporting rollers it is desirable to divide the inner axles and to provide each two appertaining slots with a greater spacing at the centre than at the ends. It is also possible to mount a bell crank lever on the axle for each roller or roller-group, the one arm of which is pivotally connected either indirectly, for example by rods and links, or in direct fashion, with the roller-groups, and when the vehicle is travelling in a straight line said lever arm is situated parallel to the axle, and the other arm of the bell crank, when the vehicle moves in a curve, is rocked by a fixed pin located on the vehicle.

This bell crank-lever control may be effected in convenient manner by directly connecting one arm of the lever pivotally with the roller-group.

Another possibility consists in arranging the axle members engaging with the roller-groups to be relatively shiftable within a hollow shiftable axle.

The invention will now be described more fully with reference to the accompanying drawings, in which Fig. 1 is a diagrammatic plan view of one form of embodiment of the invention, making use of a slide member which at the same time causes the shortening of the axles.

Fig. 4 is a part view in plan showing an arrangement for contracting the axle ends in a hollow shaft.

Fig. 5 is a sectional view taken on line V—V of Fig. 6.

Fig. 6 is a plan view showing a form of embodiment of the links of Figs. 2 and 3.

Fig. 7 is a plan view illustrating the steering of single groups of rollers.

Fig. 8 is a part view in plan showing on a larger scale the effect of the axle-shortening links of the middle-axle shown in Fig. 3.

Figure 1:
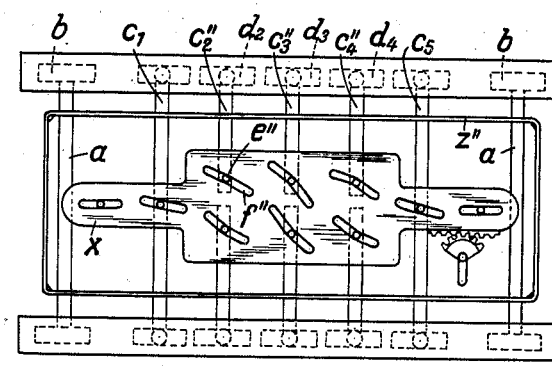

On the front and rear axles $a$ there are mounted the guide wheels $b$ for the endless chains. In all of the figures these end axles are shown to be fixed and incapable of displacement. The inner movable axles $c_1$ to $c_5$ are shiftable. The movable axles $c_1$ and $c_5$ are of constant length in their lateral displacement. On the other hand the axles $c_2$, $c_3$, $c_4$ in all of the embodiments shown in the drawings are shortened upon undergoing such displacement.

In the embodiment according to Fig. 1 this is accomplished by the fact that these axles $c_2''$ to $c_4''$ are divided, and the spacing between the rollers $d_2$, $d_3$, $d_4$ corresponding with each other is governed by guiding of pins $e''$ on these axles in corresponding slots $f''$ in a slide $x$ mounted in the frame $z''$. The slots $f''$ for the three middle axles $c_2''$ to $c_4''$ have a maximum slope to the horizontal, Fig. 1. The single slots $f''$ of each pair of slots are inclined in such fashion that the pins $e''$ are spaced to the greatest extent apart when the vehicle is travelling in a straight line and to the smallest extent apart when the vehicle makes the sharpest turn. Each of the axles $c_1$ and $c_5$ being only shiftable but not shortable is only governed by guiding of a single pin $e''$ on the axle in a single slot $f''$ inclined straightaway in the slide $x$.

Figure 2:
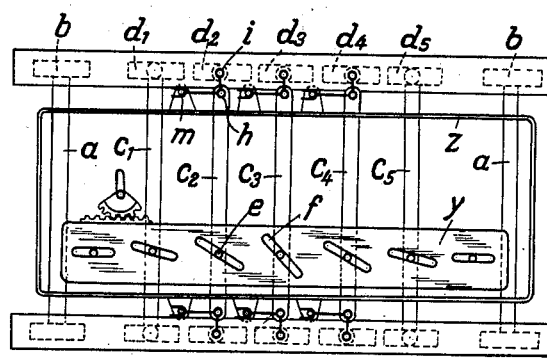
Fig. 2 is a view similar to Fig. 1 of a modified form of embodiment making use of a slide for displacement of the axles and links for shortening the axles.

In the embodiment according to Fig. 2 the axles $c_2$, $c_3$, $c_4$ are constructed without a break. The ends of these axles, however, are not directly connected with the hinge bolts of the roller groups but with the interposition of positively controlled bell cranks, as shown in detail in Figs. 5 and 6. The center pin $h$ of each bell crank is mounted to be rotatable in the axle $c$, and a group of rollers $k$ is pivotally mounted on a pin $i$ carried by one arm $l'$ of the bell crank. The positive rotation of the bell crank takes place by means of its other arm $l$, which has a pin and slot connection with the frame $z$ of the vehicle, the pin $m$ of this connection being fixed in a projecting part of the frame, as shown.

Figure 3:
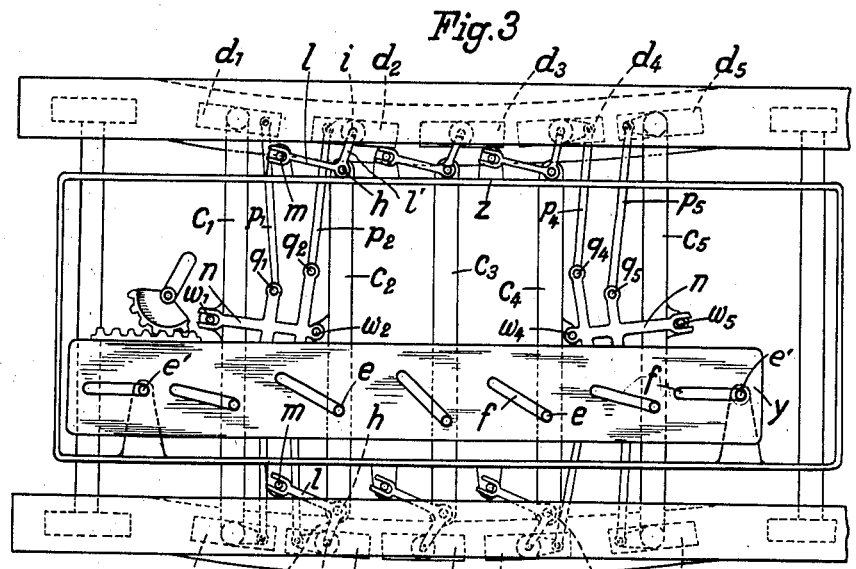
Fig. 3 is a corresponding view showing the effect of the axle-shortening links when the vehicle describes a curve, this figure also showing means for moving some of the roller-groups into the corresponding arcs.

Fig. 3 shows more concisely the operation of the bell cranks. The two endless chains are curved about a common point. Upon displacement of the axles $c_2$, $c_3$ and $c_4$ longitudinally of their axes the cranks are rocked about the pins $h$ and thereby moved from the middle positions. The displacement of the axles shown in Fig. 3, to a degree corresponding with the displacement of the axles is effected by the slide $y$ with slots $f$ engaging pins $e$ on the axles. The angle of inclination of the slots $f$ increases from either end of the slide $y$ towards the centre, the slot at each end of the slide $y$ being parallel to the longitudinal axis of the vehicle and engaging a guide pin $e'$ fixed to the frame $z$ of the vehicle.

In consequence the arms $l$ and $l'$ assume an inclined position whereby the pins $i$ are rocked out of alignment with the axes of the axles $c_2$, $c_3$, $c_4$. There occurs, therefore, an approach of opposite rollers towards each other, and also a displacement of all these rollers in the line of travel of the vehicle. When the arms $l$ assume an inclined position relative to the longitudinal axis of the vehicle, the short arms $l'$, which are integral with the arms $l$ and connect the pins $h$ with the pins $i$, will swing the pins $i$ in a circumference around the pins $h$. In Fig. 8 the dotted lines indicate the relationship of the parts when the wheels $d_3$ have been shifted in the direction indicated by the arrow R. The pins $m$ remain in exactly the same position as also indicated in Figs. 2 and 3 since they are mounted rigidly on the frame of the vehicle. As a result thereof the lateral distance (that is the gauge), for example, between the two rollers $d_3$ on the ends of the axle $c_3$ will be shortened from A to B, because one of the two sides of a right-angled triangle which contain the right angle is always shorter than the hypotenuse now formed by the inclined arm $l'$. The two triangles indicated in long dash lines in Fig. 8 show that the distance B equals the distance A minus the distance $B_1$, minus $B_2$. The same is true for the two rollers $d_2$ and for the two rollers $d_4$. At each end of each axle $c_1$—$c_5$ either a single large roller or a group $d$ of rollers (as in the case of a small vehicle with 4 small rollers $k$) may be secured. Thus there occurs a narrowing of the distance between the rollers or roller-groups of each of the axles $c_2$, $c_3$, $c_4$ relative to each other.

Fig. 3 also shows on a larger scale the steering of the groups of rollers. Each axle $c_1$, $c_2$, $c_3$, $c_4$, $c_5$ has a group of rollers at each of its ends, each group $d_1$, $d_2$, $d_3$, $d_4$, $d_5$ comprising a plurality of rollers $k$ as shown in Fig. 6, organized into a unit. The roller groups $d_1$, $d_2$, $d_4$ and $d_5$ require to be moved into corresponding arcs, while the roller groups $d_3$ of the middle axle remain parallel to the axis of the vehicle. The opposite roller groups $d_1$, $d_2$, $d_4$, $d_5$ on each axle $c_1$, $c_2$, $c_4$, $c_5$ require to be adjusted at different angles to the axis of the vehicle. The proper angular setting of the roller groups is accomplished by rod $n$, which upon relative longitudinal displacement of two axles ($c_1$ in relation to $c_2$ or $c_4$ in relation to $c_5$) assume a position oblique to the axis of the vehicle. Each rod $n$ serves a pair of axles and is jointed to them as shown in Fig. 3, the left hand rod $n$ being jointed at $w_1$ to the axle $c_1$ and at $w_2$ to the axle $c_2$ while the right hand rod $n$ is jointed at $w_4$ to the axle $c_4$ and at $w_5$ to $c_5$. The different degrees of inclination of single groups of rollers is accomplished by the fact that the steering rods $p_1$, $p_2$, $p_4$, $p_5$ for the roller groups $d_1$, $d_2$, $d_4$, $d_5$ do not engage the rod $n$ at its middle axis but are jointed to them at points $q_1$, $q_2$, $q_4$, $q_5$ situated laterally thereof. By suitable arrangement and spacing of the joints $w_1$, $w_2$, $q_1$, $q_2$; $w_4$, $w_5$, $q_4$, $q_5$ of the rods $n$, see Fig. 3, it is possible to accomplish exactly the necessary extent of movement on the part of the groups of rollers.

Fig. 4 shows in detail and on a larger scale a movable middle axle of variable length. The axle comprises a hollow shaft $c_3'$ in which are guided, so as to be longitudinally movable, axle stubs $r$ connected with the hinge bolts of the roller groups. The distance between the axle stubs and accordingly between the roller groups $d_3'$ is determined by the position of a lever $s$, which rocks about a pin $u$ and upon the displacement of the shaft $c_3'$ this lever $s$ is moved into an inclined position, owing to the pivoting of said lever $s$ on a pin $t$ fixed on the frame. This rocking of the lever $s$ moves the axle stubs $r$ together by means of links $v$.

In Fig. 5 there is shown the shortening of the axle with the aid of the bell crank $i$, $l'$, $h$. Fig. 6 shows the same arrangement viewed from above. The crank arm $l$ upon the displacement of the axle $c$ longitudinally of its axis is rocked about the pin $m$ which it engages by means of its slotted end, and thereby causes a certain angular movement of the crank $h$, $l'$, $i$, so that a displacement of the roller group $d$ takes place having a component in the longitudinal direction of the axle $c$.

In Fig. 7 there is shown the steering of two opposite groups of rollers by a connecting rod $n$. Links $p_1$, $p_2$ engage pins $q_1$, $q_2$ disposed on both sides of the axis of the rod and connect said rod with the roller groups $d_1$, $d_2$. In this way the lever mechanism is maintained in extended condition when the vehicle is travelling in a straight line, but is shortened when taking a curve.

In Figs. 1, 2, 5 and 6 on account of clearer arrangement the means for deflecting the single roller groups $d_1$, $d_2$, $d_4$, $d_5$ (Figs. 1 and 2), $d$ (Figs. 5 and 6) from the longitudinal direction of the vehicle are not shown. The same, however, may be provided in the same fashion as illustrated in Figs. 3 and 7. For the same reason in Fig. 7 the slide $y$ for shifting the axles $c_1$, $c_2$ is not shown. It may be the same as illustrated in Figs. 2 and 3.

What I claim as new and desire to secure by Letters Patent is:

1. In a steering means for endless track-driven vehicles, endless chains, fixed guide wheels for the said chains at either end of the vehicle, rollers intermediate of the said wheels for supporting the said chains over their length, shiftable intermediate axles supporting the said rollers, and means for shifting the said axles transversely of the said vehicle and for deflecting the said rollers to varying extent from the longitudinal direction of the vehicle for varying the transverse spacing between opposite rollers on the intermediate axles in such a manner that when the vehicle is steered into a curve the radius of the said rollers on the inside of the curve is smaller than that of the rollers on the outside of the curve.

2. In a steering means for endless track-driven vehicles, endless chains, front, rear and intermediate rollers for supporting the said chains, shiftable intermediate axles supporting the said intermediate rollers, and means including a slide disposed longitudinally of the vehicle having inclined slots the angle of inclination of which increases from either end of the said slide towards the centre, and pins on the axles engaging in the said slots and shifting the said axles by varying amounts upon actuation of the said slide for varying the transverse spacing between opposite rollers on intermediate axles in such a manner when the vehicle is steered into a curve the radius of the said rollers on the inside of the curve is smaller than that of the rollers on the outside of the curve.

3. In a steering means for endless track-driven vehicles, endless chains, a series of shiftable rollers for supporting the said chains, shiftable axles supporting the end rollers of the series, shiftable axles of variable length supporting the last-mentioned rollers, means for shifting the middle axles, and means for varying the transverse spacing of the opposite rollers mounted on the variable length axles.

4. In a steering means for endless track-driven vehicles, endless chains, a series of shiftable rollers for supporting the said chains, throughgoing shiftable axles supporting the end rollers of the series, divided axles supporting the middle rollers, means for shifting the said axles, and means for contracting and extending the said divided axles for the purpose of varying the transverse spacing of the said rollers mounted thereon.

5. In a steering means for endless track-driven vehicles, endless chains, a series of shiftable rollers for supporting the said chains, a slide disposed longitudinally of the vehicle having inclined slots the angle of inclination of which increases from either end of the said slide towards the centre, the central slots being disposed in pairs and curved towards each other, throughgoing shiftable axles supporting the end rollers of the series, divided axles supporting the middle rollers, and pins on all of said axles engaging in the corresponding slots and shifting the said axles by varying amounts upon actuation of the said slide.

6. In a steering means for endless track-driven vehicles, a frame, endless chains, rollers for supporting the said chains, shiftable axles supporting the said rollers, and a bell crank-lever pivoted to each of the said axles, the one arm of the said lever being linked to the rollers and disposed parallel to the axle when the vehicle is travelling in a straight line, and the second arm of the said lever being pivoted at a fixed point on the frame of the vehicle and caused to pivot about said point when the vehicle is steered into a curve to negotiate a curve.

7. In a steering means for endless track-driven vehicles, endless chains, rollers for supporting the said chains, shiftable axles supporting the said rollers, a bell crank-lever pivoted to each end of each of the said axles and linked with its one arm to the adjacent rollers, to vary the lateral distance between two rollers on the same axle and lever mechanisms for deflecting the said rollers from the longitudinal direction of the vehicle in fixed relation to each other.

8. In a steering means for endless track-driven vehicles, endless chains, rollers for supporting the said chains, means for shifting certain of the said rollers transversely of the vehicle comprising hollow axles, axle stubs in the said hollow axle supporting the said rollers, a link mechanism connecting the inner ends of the said axle stubs, and a pin and slot guide for actuating the said link mechanism, and means for deflecting the said rollers by said guide and link mechanism to varying extent from the longitudinal direction of the vehicle.

9. In a steering means for endless track-driven vehicles, having endless track chains, front, rear and intermediate rollers for supporting the said chains, and means for transversely displacing the intermediate rollers in combination with means for deflecting a number of said transversely movable rollers, from the longitudinal direction of the vehicle, and means for varying the transverse distance between opposite rollers of each intermediate axle in such a manner that when the vehicle is to negotiate a curve the radius of the said rollers on the inside of the curve is smaller than that of the rollers on the outside of the curve.

WOLFRAM von BLEICHERT.